United States Patent [19]

Giannini et al.

[11] 4,265,785

[45] May 5, 1981

[54] POLYMERIZATION CATALYST

[75] Inventors: Umberto Giannini; Paolo Longi; Domenico Deluca; Angelo Pricca, all of Milan, Italy

[73] Assignee: Montecatini Edison S.p.A., Milan, Italy

[21] Appl. No.: 65,430

[22] Filed: Aug. 10, 1979

Related U.S. Application Data

[63] Continuation of Ser. No. 963,179, Nov. 24, 1978, abandoned, which is a continuation of Ser. No. 814,936, Jul. 12, 1977, abandoned, which is a continuation-in-part of Ser. No. 530,205, Dec. 6, 1974, abandoned, which is a continuation of Ser. No. 167,872, Jul. 30, 1971, abandoned.

[30] Foreign Application Priority Data

Jul. 31, 1970 [IT] Italy ................... 28131 A/70

[51] Int. Cl.³ .................... C08F 4/02; C08F 4/64
[52] U.S. Cl. .................... 252/429 B; 252/429 C; 526/97; 526/102; 526/107; 526/119; 526/125; 526/129; 526/132; 526/155; 526/156
[58] Field of Search ................... 252/429 B, 429 C

[56] References Cited

U.S. PATENT DOCUMENTS

| 2,981,725 | 4/1961 | Luft et al. .................. 252/429 C X |
| 3,166,542 | 1/1965 | Orzechowski et al. ...... 252/429 A X |
| 3,481,915 | 12/1969 | Kahle et al. ................. 252/429 B X |
| 3,558,587 | 1/1971 | Bayer et al. ................. 252/429 B X |
| 3,670,043 | 6/1972 | Kubicek et al. ............. 252/429 B X |
| 3,676,418 | 7/1972 | Tashiro et al. .............. 252/429 B X |
| 3,738,944 | 6/1973 | Candlin et al. .............. 252/429 B X |
| 3,766,160 | 10/1973 | Caunt ......................... 252/429 B X |
| 3,781,220 | 12/1973 | Shilou et al. ................ 252/429 B |
| 3,850,842 | 11/1974 | Longi et al. ................. 252/429 C |

FOREIGN PATENT DOCUMENTS

| 601919 | 7/1960 | Canada. |
| 1958488 | 5/1970 | Fed. Rep. of Germany. |
| 1958046 | 6/1970 | Fed. Rep. of Germany. |
| 94679 | 8/1969 | France. |
| 2014330 | 4/1970 | France. |
| 981375 | 1/1965 | United Kingdom. |
| 1264416 | 2/1972 | United Kingdom. |
| 1286867 | 8/1972 | United Kingdom. |
| 1292853 | 10/1972 | United Kingdom. |

*Primary Examiner*—Patrick Garvin

[57] ABSTRACT

New, highly active catalysts for the polymerization of ethylene and mixtures of ethylene with higher alpha-olefins and/or diolefins, are disclosed. The catalysts are prepared by mixing (a) hydrides or organometallic compounds of metals belonging to Groups I, II or III of the Mendelycev Periodic Table with (b) the products obtained by contacting titanium compounds with activated anhydrous halides of magnesium or manganese, diluted with anhydrous compounds of metals belonging to Group III or IV of said Periodic Table, and which are different from either (a) or the titanium compound of (b).

4 Claims, No Drawings

POLYMERIZATION CATALYST

This is a continuation of application Serial No. 963,179 filed Nov. 24, 1978 (now abandoned) which in turn is a continuation of application Ser. No. 814,936 filed Jul. 12, 1977 (now abandoned) which in turn is a continuation-in-part of application Ser. No. 530,205 filed Dec. 6, 1974 (now abandoned) which in turn is a continuation of application Ser. No. 167,872 filed Jul. 30, 1971 (now abandoned).

THE PRIOR ART

The homo- and co-polymerization of ethylene has been carried out heretofore with the aid of catalysts of various types.

Among the best known of such catalysts nowadays are those prepared by mixing transition total compounds with organometallic compounds of the Groups I to III metals.

In earlier applications originating with our group, it was shown that catalysts of markedly increased activity could be obtained by contacting Ti or V compounds with carriers consisting of activated anhydrous dihalides of magnesium or manganese, and then mixing the resulting product with hydrides or organometallic compounds of the Groups I to III metals.

THE PRESENT INVENTION

We have found that, surprisingly, it is possible to obtain catalysts which are generally as active, in the polymerization of olefins, as Ziegler/Natta catalysts supported on the active Mg or Mn dihalides aforesaid as sole carrier or which exhibit very high activity in comparison with unsupported Ziegler/Natta catalysts or such catalysts supported on, as sole carrier, a support other than a Mg or Mn dihalide in activated condition, by mixing the following starting catalyst-forming components:

(a) a hydride or organometallic compound of a metal belonging to one of Groups I to III of the Mendelyeev Periodic Table and (b) the product obtained by contacting a Ti compound (1) with a support consisting of a mixture of an anhydrous Mg or Mn dihalide (2) and an anhydrous compound of a metal belonging to Group III or IV of said Periodic Table (3), the Mg or Mn dihalide (2) being in an active state such that it and the support have a surface area exceeding 3 m$^2$/g or the X-rays powder spectrum of component (b) does not show the most intense diffraction lines as they appear in the X-rays powder spectrum of the corresponding normal, non-active Mg or Mn dihalide, the X-rays powder spectrum of component (b) showing a broadening of said most intense diffraction lines; said anhydrous compound of the metal belonging to Groups III or IV of the Mendelyeev Periodic Table (3) being one which does not interact or does not substantially interact, with the Mg or Mn dihalide under the conditions of the catalyst are preparation.

By "does not interact" and "does not substantially interact", with respect to the compounds of Group III or IV, is meant that said compounds do not interact with the active Mg or Mn dihalide to a substantial extent that would alter the activity of the activated Mg or Mn dihalide. However, the activity of the resulting catalyst referred to the Mg or Mn dihalide is remarkably increased.

The fact that the addition of compounds of metals of III and IV Groups of the Periodic Table to the Mg or Mn dihalide, in active state, does not reduce appreciably the activity of the catalysts therefrom but generally increases said activity, is completely unexpected, if one considers that the activity of the catalysts supported on, as sole carrier, said compounds of metals of III and IV Groups, is very low. The addition should have produced a remarkable reduction in the activity.

The anhydrous compounds used as cosupports with an anhydrous Mg dihalide are selected from the group of the salts and oxide of the metals of Groups III and IV of the Periodic Table. They are all operative for the use of cosupports according to this invention, provided they do not react or do not substantially react with the anhydrous Mg dihalide under the conditions of the catalyst preparation.

The anhydrous Mg or Mn halides can be converted to the active form during the contacting with the titanium compound, or may be activated prior to such contacting.

Various methods can be used for preactivating the Mg or Mn halide.

One of the most suitable methods consists in dissolving the halides in alcohols, ethers or other organic or inorganic solvents, removing most of the solvent by rapid evaporation, and then completing the solvent removal at reduced pressure and at temperatures higher than 100° C., and comprised, more particularly, between 150° C. and 500° C.

The preactivated Mg and Mn halides can be obtained, also, by very fine grinding of the carrier particles, or by any other physical method involving subjecting the carrier particles to the action of friction and/or sliding forces.

Another method for obtaining the Mg halides in the active form comprises starting with RMgX compounds, in which R is a hydrocarbon radical and X is halogen, and converting the same to the active Mg halide either by disproportionment according to known methods, or by treatment of the RMgX compound with halogenated compounds such as, for instance, HCl.

The preactivated anhydrous magnesium or manganese halide can be obtained by thermal decomposition, under reduced pressure, of an addition compound of the halide with a Lewis acid base.

A presently preferred method of preparing the supported catalyst forming component consists in co-grinding the Ti compound with a mixture of the Mg or Mn halide and an anhydrous compound of the metal belonging to Group III or IV. The co-grinding is preferably carried out in a ball mill, under dry conditions, without use of any liquid diluent or solvent.

The supported catalyst-forming compound can also be prepared by simply adding the Ti compound to a previously ground mixture of the Mg or Mn halide and the anhydrous compound of the Group III or IV metal.

The compounds of Group III or IV metals which are substantially inert to the anhydrous Mg or Mn halide under the conditions used to prepare the carrier, include: Aluminum chloride, lead dichloride, tin dichloride, aluminum oxide, silicium oxide, tin oxides, titanium dioxide, zirconium dioxide, aluminum sulphate, titanyl sulphate, aluminum stearate, tin basic sulphate, lead sulphate, aluminum phosphate and boric anhydride.

The amount of the anhydrous Group III or IV metal compound which can be mixed with the anhydrous Mg or Mn halide without appreciably reducing the activity of the catalyst may vary widely.

Mixtures of the Mg or Mn halide with the Group III or IV metal compounds in which the quantity of the Group III or IV metal compound is from 1% to 80% by weight, preferably from 30% to 80% by weight, yield final catalysts the activity of which is comparable to the activity of the catalysts obtained from carriers consisting only of anhydrous Mg Cl$_2$ or Mn Cl$_2$, in Activated form.

The titanium compounds which can be contacted with the mixture of active Mg or Mn halide and Group III or IV metal compound to obtain the supported catalyst-forming component, include the halides, oxyhalides, halo-alcoholates, alcoholates, halo-titanates or titanates of ammonium and alkylammonium or of alkaline metals; the Ti-amides and Ti-halo-amides: the Ti salts of organic acids, as well as the addition compound of bivalent, trivalent and tetravalent titanium with electron-donor compounds in which the electron-donor atoms are generally atoms of N, P, O and S, such as:

ethers, phosphines, amines and thioethers.

Other useful Ti compounds are those obtainable from the aforesaid Ti compounds and from alcoholates and amides of the alkaline metals, such as:

Li(OC$_3$H$_7$)$_2$Cl$_3$ and LiTi(C$_{12}$H$_8$N)$_4$. C$_{12}$H$_8$N being the carbazyl radical.

Typical examples of Ti compounds useful for preparing the catalysts according to the present invention are:
TiCl$_4$, TiCl$_3$, 3TiCl$_3$.AlCl$_3$, TH$_4$, Ti(OC$_3$H$_7$)Cl$_3$, Ti(OC$_4$H$_9$)$_2$Cl$_2$, Ti[O C(CH$_3$)-CH-CO-CH$_3$]$_2$Cl$_2$, Ti[N(C$_2$H$_5$)$_2$]Cl$_3$, Ti[N(C$_6$H$_5$)$_2$]Cl$_3$, Ti[N(C$_6$H$_5$)$_2$]$_4$, TiCl$_3$(OSO$_2$-C$_5$H$_5$), Ti(C$_6$H$_5$COO)Cl$_3$, [N(C$_4$H$_9$)$_4$]$_2$TiCl$_6$, [N(CH$_3$)$_4$]Ti$_2$Cl$_9$, TiBr$_4$, O(C$_2$H$_5$)$_2$, 2TiCl$_3$.C$_5$H$_5$N, LiTi(OC$_3$H$_7$)$_2$Cl$_3$, LiTi(C$_{12}$H$_8$N)$_4$ (lithium-titanium tetracarbazyl).

The amount of Ti compound used in preparing the carried catalyst-forming component can vary within a wide range. For instance, the Ti compound can be used in a minimum amount of 0.01% by weight, or even less, with respect to the carrier, up to a maximum amount of 30% or higher, by weight.

Particularly good results, so far as concerns the polymer yield obtained with the catalysts of this invention, and referred to both the Ti compound and the carrier, are obtained when the amount of Ti compound on the carrier is from 1% to 10% by weight.

Hydrides and organometallic compounds which can be used as other catalyst-forming component include:
Al(C$_2$H$_5$)$_3$, Al(C$_2$H$_5$)$_2$H, Al(iC$_4$H$_9$)$_3$, Al(iC$_4$H$_9$)$_2$Cl, Al$_2$(C$_2$H$_5$)$_3$Cl$_3$, Al(C$_2$H$_5$)$_2$Cl, Al(iC$_4$H$_9$)$_2$H, Al(C$_2$H$_5$)$_2$Br, LiAl(iC$_4$H$_9$)$_4$, LiC$_4$H$_9$; which are particularly fit for the catalyst preparation.

The molar ratio of organometallic compound to Ti compound is not critical.

When the catalysts are to be used for polymerizing ethylene, the molar ratio is preferably comprised between 50 and 1000.

The polymerization and copolymerization of olefins in contact with the present catalysts are carried out by the conventional methods, namely in the liquid phase, either in the presence or absence of an inert solvent, or in the gas phase.

The polymerization or copolymerization temperature may range from −30° C. to 200° C., preferably from 50° C. to 100° C., provided the operation is conducted at atmospheric pressure or at increased pressure.

It is a particularly important advantage of the catalysts of this invention that the activity of the catalysts is not appreciably reduced when they are used in the presence of the conventional regulators of the molecular weight of the olefin polymers or copolymers, such as alkyl halides, organometallic compounds of zinc or cadmium, or hydrogen.

This is in contrast to known catalysts such as the so-called, now conventional, "Ziegler catalysts" prepared from transition metal compounds of the type of TiCl$_4$, and organometallic compounds of the Groups I, II and III metals. As is well known, the activity of such known catalysts is considerably reduced by the presence, in the polymerization system, of hydrogen or the other known chain transfer agents commonly used to regulate the molecular weight of the polymer produced.

With the present catalysts, conversely, it has been found possible to regulate the molecular weight of the polymer produced to low, and even very low values, without any noticeable decrease in the activity of these catalysts.

For instance, when ethylene is polymerized in contact with the catalysts of this invention, it is possible to adjust the molecular weight of the polyethylene produced to values in a pratically desirable range corresponding to an inherent viscosity of about 1 to 3 dl/g, determined in tetralin at 135° C. And this can be accomplished without causing any decrease in the polyethylene yield, based on the amount of these particularly active catalysts used, to a value such that, at the end of the polymerization, it is necessary to subject the polymer to special purification treatments for the removal of catalytic residues from it.

The fact that the polymer can be used directly as obtained, without resort to the special purification treatments, is another marked advantage of the catalysts of this invention.

The polyethylene obtained with the aid of the present catalysts is a substantially linear and highly crystalline polymer having a density of 0.96 g/cc or higher. Its workability or processability characteristics are generally better than those of the polyethylene obtained with the aid of the standard "Ziegler catalysts".

Generally, the Ti content of the unpurified polymer obtained using the present catalysts is lower than 10 ppm.

The present catalysts in which the carrier is diluted with the Group III or IV metal compound, also have some advantages over the catalysts disclosed previously by our group and in which the carrier consists only of the activated anhydrous halides of magnesium or manganese.

The main such advantage is that any catalytic residues remaining in the polyethylene obtained with the aid of the present catalysts comprise even smaller amounts of magnesium halide and, in consequence, afford even less possibility of corrosion when the polyethylene is molded or otherwise shaped by the usual molding and shaping procedures.

The following examples are given to illustrate the invention and are not intended to be limiting. Unless otherwise specified, percentages given in the examples are by weight. The inherent viscosity of the polymer was determined in tetralin at 135° C.

EXAMPLES 1 to 6

$TiCl_4$, anhydrous $MgCl_2$ (dried for 48 hours in HCl flow at 350° C.) or mixtures of same with some anhydrous compounds of metals belonging to the III and IV Groups of the Mendelyeev Periodic system, in the quantities specified in Table I, are introduced into a glass mill (length- 100 mm, diameter: 50 mm) containing 550 g of steel balls having a 9.5 mm diameter, in nitrogen atmosphere.

The mixture thus obtained is then ground for 16 hours at a temperature of 20° C.

A given quantity of the mixture thus prepared is introduced, together with 1500 cc of n-heptane and 2 cc of $Al(i-C_4H_9)_3$, into a stainless steel autoclave of 3000 cc capacity, provided with an anchor stirrer and adjusted at a temperature of 85° C.

The whole is charged with 7 atm. of hydrogen and 6 atm. of ethylene, and the pressure is kept constant by continuously feeding in ethyl.

The polymerization is interrupted after 4 hours; a filtration is carried out, and the polymer obtained is then dried.

The results, concerning the quantity and inherent viscosity of the polymer obtained, as well as the polymer yield with respect to the employ titanium-carried component, and $MgCl_2$, are reported in Table I.

EXAMPLES 7 to 12

$3TiCl_3 \cdot AlCl_3$ (obtained by reduction of $TiCl_4$ with aluminum and activated by grinding), anhydrous $MgCl_2$ or mixtures of same with some anhydrous compounds of metals belonging to the Groups III and IV, in the quantities specified in Table II, are ground for 16 hours at 20° C. in the mill described in Example 1, in nitrogen atmosphere.

By using a given quantity of the mixture thus obtained and by operating under the polymerization conditions described in Example 1, the results indicated in Table II were obtained.

EXAMPLES 13 to 15

$3TiCl_3 \cdot AlCl_3$ (obtained by reduction of $TiCl_4$ with aluminum are activated by grinding) and anhydrous $MnCl_2$ (obtained by dissolution of $MnCl_2$ in ahydrous ethanol, evaporation and successive grinding at 300° C. under a 0.5 mm Hg vacuum), or mixtures of same with some anhydrous compounds of the Group IV metals, in the quantities specified in Table III, are ground for 24 hours in the mill described in Example 1, in nitrogen atmosphere, at 20° C.

By using a given quantity of the mixtures thus obtained, ethylene polymerization tests have been carried out under the experimental conditions indicated in Table III, the same table reports also the relevant results.

EXAMPLES 16 and 17

$Cl_3TiN(C_2H_5)_2$ and anhydrous $MgCl_2$ or a mixture of same with silica, according to the quantities specified in Table IV, are ground for 64 hours in the mill described in Example 1, in nitrogen atmosphere, at 20° C.

By using a given quantity of the mixtures thus obtained and by operating under the polymerization conditions according to Example 1, the results specified in Table IV are attained.

EXAMPLES 18 and 19

$Cl_3Ti(n-OC_3H_7)$ and anhydrous $MgCl_2$ or a mixture of same with silica, in the quantities specified in Table V, are ground for 16 hours in the mill described in Example 1, in nitrogen atmosphere, at 20° C.

By using a given quantity of the mixtures thus prepared, some ethylene polymerization tests have been carried out under the experimental conditions indicated in Table V; the same table reports also the results attained.

EXAMPLES 20 to 22

$TiCl_4$ and anhydrous $MgCl_2$ or mixtures of same with anhydrous $PbCl_2$ or $SnCl_2$, in the quantities reported in Table VI, are ground for 16 hours in the mill described in Example 1, in nitrogen atmosphere, at 20° C.

By employing a given quantity of the mixtures thus prepared, some ethylene polymerization tests have been carried out under the experimental conditions indicated in Table VI, in which also the attained results are shown.

TABLE I

| Example No. | Grinding of the Carried Component | | | | Carried component employed mg | Polymerization | | | | |
|---|---|---|---|---|---|---|---|---|---|---|
| | $MgCl_2$ g | Diluent Type | Diluent g | $TiCl_4$ g | T: % by weight | | Polyethylene obtained g | g Polymer g Ti | g Polymer g total carried component | g Polymer g $MgCl_2$ | $\eta$ in $dl.g^{-1}$ |
| 1 | 1.7010 | SMica* | 1.6240 | 0.140 | 1.02 | 19.0 | 203 | 1,045,000 | 10,600 | 21,780 | 1.16 |
| 2 | 4.3082 | $TiOSO_4$ | 4.3500 | 0.3580 | 1.005 | 14.2 | 146 | 1,020,000 | 10,270 | 21,500 | 1.46 |
| 3 | 4.3852 | $B_2O_3$ | 4.3256 | 0.278 | 0.782 | 23.7 | 142 | 766,000 | 6,000 | 12,320 | 1.30 |
| 4 | 4.2726 | $Al_2(SO_3)$ | 4.2350 | 0.352 | 1.005 | 32.2 | 235 | 728,000 | 7,300 | 15,120 | 1.26 |
| 5 | 4.2882 | $AlFo_4$ | 4.3172 | 0.4110 | 1.147 | 31.7 | 351 | 991,000 | 11,350 | 23,250 | 1.26 |
| 6 | 0.0105 | — | — | 0.4000 | 0.97 | 11.0 | 90 | 844,000 | 8,180 | 8,510 | 1.33 |

*Syloid Al-1 silica, Grace-Davison, calcined at 900° C. for 6 hours in nitrogen flow

TABLE II

| Example No. | Grinding of the Carried Component | | | | Ti % by weight | Carried Component employed mg | Polymerization | | | | |
|---|---|---|---|---|---|---|---|---|---|---|---|
| | $MgCl_2$ g | Diluent type | Diluent g | $3 TiCl_3 \cdot AlCl_3$ g | | | Polyethylene obtained g | g Polymer g Ti | g Polymer g total carried component | g Polymer g $MgCl_2$ | $\eta$ in $dl.g^{-1}$ |
| 7 | 2.6185 | Silica* | 4.9592 | 1.6373 | 4.28 | 10.2 | 365 | 410,000 | 17,550 | 62,000 | 1.49 |
| 8 | 1.4826 | " | 5.9293 | 1.5188 | 4.12 | 21.2 | 279 | 320,000 | 13,150 | 80,160 | 1.61 |

TABLE II-continued

| | Grinding of the Carried Component | | | | Polymerization | | | | | |
|---|---|---|---|---|---|---|---|---|---|---|
| Example No. | MgCl$_2$ g | Diluent type | Diluent g | 3 TiCl$_3$ · AlCl$_3$ g | Ti % by weight | Carried Component employed mg | Polyethylene obtained g | g Polymer g Ti | g Polymer g total carried component | g Polymer g MgCl$_2$ | $\eta$ in dl.g$^{-1}$ |
| 9 | 2.6437 | Silica*** | 4.9840 | 1.6632 | 4.32 | 18.8 | 236 | 291,000 | 12,550 | 44,100 | 1.55 |
| 10 | 7.1536 | Alumina** | 4.3099 | 2.6208 | 4.34 | 21.3 | 178 | 192,000 | 8,360 | 16,320 | 1.40 |
| 11 | 2.6274 | Kleselgur | 5.0276 | 1.6607 | 4.29 | 26.0 | 199 | 178,000 | 7,650 | 27,150 | 1.70 |
| 12 | 7.4272 | — | — | 1.6088 | 4.28 | 15.6 | 166 | 249,000 | 10,650 | 12,930 | 1.33 |

*Syloid Al-1 silica, Grace-Davison, calcined at 900° C. for 6 hours in nitrogen flow
**Merck alumina, calcined at 500° C. in nitrogen flow
***Syloid Al-1 silica, Grace-Davison, calcined at 300° C. for 8 hours in nitrogen flow

TABLE III

| | Grinding of the Carried Component | | | | Polymerization | | | | | |
|---|---|---|---|---|---|---|---|---|---|---|
| Example No. | MnCl$_2$ g | Diluent Type | Diluent g | 3 TiCl$_3$ · AlCl$_3$ g | Ti % weight | Carried Component employed mg | Polyethylene obtained g | g Polymer g Ti | g Polymer g total carried component | g Polymer g MnCl | $\eta$ in dl.g$^{-1}$ |
| 13 | 2.7658 | Silica* | 5.0120 | 0.3543 | 1.05 | 53.5 | 370 | 658,000 | 6,920 | 20,350 | 2.09 |
| 14 | 4.3091 | TiO$_2$ | 4.3311 | 0.3807 | 1.018 | 43.0 | 301 | 688,000 | 7,000 | 14,650 | 2.09 |
| 15 | 8.6208 | — | — | 0.3834 | 1.025 | 34.6 | 185 | 522,000 | 5,350 | 5,580 | 2.44 |

*Syloid Al-1 silica, Grace-Davison, calcined at 900° C. for 6 hours in nitrogen flow Polymerization conditions
Autoclave: 3,000 cc    H$_2$: 5 atm.
Temperature: 85° C.    Ethylene: 10 atm. const.
N-heptane: 1,500 cc    Time: 8 hours
Al(i-C$_4$H$_9$)$_3$: 2 cc

TABLE IV

| | Grinding of the Carried Compound | | | | | Polymerization | | | | | |
|---|---|---|---|---|---|---|---|---|---|---|---|
| Example No. | MgCl$_2$ g | Diluents Type | Diluents g | Titanium Compound Type | Titanium Compound g | Ti % by weight | Carried Component employed mg | Polyethylene obtained g | g Polymer g Ti | g Polymer g total carried component | g Polymer g MgCl$_2$ | $\eta$ in dl.g$^{-1}$ |
| 16 | 4.3859 | Silica* | 4.3975 | Cl$_3$TiN(C$_2$H$_5$)$_2$ | 0.3880 | 0.896 | 14.2 | 107 | 842,000 | 7,540 | 15,770 | 1.23 |
| 17 | 9.52 | — | — | Cl$_3$TiN(C$_2$H$_5$)$_2$ | 0.420 | 0.895 | 14.3 | 105 | 820,000 | 7,340 | 7,660 | 1.23 |

*Syloid Silica, Grace-Davison, calcined at 900° C. for 6 hours in nitrogen flow

TABLE V

| | Grinding of the Carried Component | | | | | Polymerization | | | | | |
|---|---|---|---|---|---|---|---|---|---|---|---|
| Example No. | MgCl$_2$ g | Diluents Type | Diluents g | Titanium Compound Type | Titanium Compound g | Ti % by weight | Carried Component employed mg | Polyethylene obtained g | g Polymer g Ti | g Polymer g total carried component | g Polymer g MgCl$_2$ | $\eta$ in dl.g$^{-1}$ |
| 18 | 4.3121 | Silica* | 4.3401 | C$_3$Ti(n-OC$_3$H$_7$) | 0.3696 | 0.807 | 16.0 | 283 | 1,976,000 | 17,680 | 36,950 | 2.0 |
| 19 | 10.810 | — | — | C$_3$Ti(n-OC$_3$H$_7$) | 0.450 | 0.900 | 12.4 | 241 | 2,160,000 | 19,400 | 20,250 | 1.97 |

*Grace-Davison Syloid silica, calcined at 900° C. for 6 hours in nitrogen flow

Polymerization conditions
Autoclave: 2,000 cc    H$_2$ = 6 atm.
Temperature: 86° C.    Ethylene = 10 atm. const.
n-heptane: 1,000 cc    Time = 8 hours
Al(iC$_4$H$_9$)$_3$: 2 cc

TABLE VI

| | Grinding of the Carried Component | | | | Polymerization | | | | | |
|---|---|---|---|---|---|---|---|---|---|---|
| Example No. | MgCl$_2$ g | Diluent Type | Diluent g | TiCl$_4$ g | Ti % by weight | Carried Component employed mg | Polyethylene obtained g | g Polymer g Ti | g Polymer g total earned component | g Polymer g MgCl$_2$ | $\eta$ in dl.g$^{-1}$ |
| 20 | 4.750 | PbCl$_2$ | 0.05 | 0.410 | 0.784 | 23.8 | 355 | 1,900,000 | 14,900 | 40,150 | 1.88 |
| 21 | 3.470 | SnCl$_2$ | 6.90 | 0.410 | 0.96 | 16.8 | 280 | 1,845,000 | 17,720 | 55,000 | 2.00 |
| 22 | 12.710 | — | — | 0.410 | 0.790 | 17.4 | 238 | 1,735,000 | 13,680 | 14,100 | 1.82 |

Polymerization conditions

TABLE VI-continued

| | Grinding of the Carried Component | | | | Polymerization | | | | | |
|---|---|---|---|---|---|---|---|---|---|---|
| | | | | | Carried Component employed | Polyethylene obtained | g Polymer | g Polymer g total earned | g Polymer | η in |
| Example No. | MgCl₂ g | Diluent Type g | TiCl₄ g | Ti % by weight | mg | g | g Ti | component | g MgCl₂ | dl.g⁻¹ |
| Autoclave: | | 2000 cc | H₂: | | 5 atm. | | | | | |
| Temperature: | | 85° C. | Ethylene: | | 10 atm. const. | | | | | |
| n-heptane: | | 1000 cc | Time: | | 8 hours | | | | | |
| Al(i-C₄H₉)₃: | | 2 cc | | | | | | | | |

EXAMPLES 23 to 25

TiCl₄ and mixtures of anhydrous MgCl₂ (dried for 48 hours in HCl flow at 350° C.) with respectively AlCl₃, SnO₂ dried under a vacuum of 0.1 mm Hg at 200° C. for 8 hours or ZrO₂ dried in a nitrogen stream at 800° C. for 16 hours were introduced in the amounts specified in Table VII into a glass mill (length 100 mm, diameter 50 mm) containing 550 g of steel balls having a 9.5 mm diameter, in nitrogen atmosphere. The mixture thus obtained was ground for 16 hours at a temperature of 20° C.

A given amount (indicated in Table VII) of the thus prepared mixture was introduced together with 1000 cc of n-heptane and 2 cc of Al(i-C₄H₉)₃ into a stainless steel autoclave of 3000 cc capacity, provided with an anchor stirrer and adjusted at a temperature of 85° C. The whole was charged with 5 atm of hydrogen and 10 atm of ethylene, up to 15 atm, and the pressure was maintained constant by continuously feeding in ethylene. The polymerization was interrupted after 8 hours. The polymer was filtered and dried. The results are reported in Table VII hereunder.

COMPARATIVE EXAMPLES 1 to 3

TiCl₄ with respectively SiO₂ and B₂O₃, and TiCl₃ARA (obtained by reduction of TiCl₄ with Al and activated by crushing) with Al₂O₃ in the amounts specified in Table VIII hereunder were introduced into a glass mill (length: 100 mm, diameter 50 mm) containing 550 g of steel balls having a 9.5 mm diameter, in nitrogen atmosphere. The mixture thus obtained was ground for 16 hours at a temperature of 20° C. A given amount (indicated in Table VIII) of the product thus prepared was introduced with 1500 cc of n-heptane and 2 cc of Al(i-C₄H₉)₃ into a stainless steel autoclave of 3000 cc capacity, provided with an anchor stirrer and adjusted at a temperature of 85° C. The whole was charged with 7 atm of hydrogen and 6 atm of ethylene, and the pressure was maintained constant by continuously feeding in ethylene. The polymerization was stopped after 4 hours. The polymer was filtered and dried. The results are reported in Table VIII hereunder.

TABLE VII

| Example No. | MgCl₂ g | Diluent type | g | TiCl₄ g | Ti content of supported catalyst component % by weight | Supported catalyst component employed in polymerization g | Polyethylene obtained g | g polymer g Ti | g Polymer g total supported catalyst component | g pol. g MgCl₂ |
|---|---|---|---|---|---|---|---|---|---|---|
| 23 | 4.47 | AlCl₃ | 6.33 | 0.41 | 0.92 | 0.0156 | 131 | 908,800 | 8,400 | 20,860 |
| 24 | 4.95 | SnO | 4.74 | 0.41 | 1.025 | 0.0195 | 143 | 715,000 | 7,330 | 14,950 |
| 25 | 5.2 | ZrO₂ | 5.15 | 0.41 | 0.96 | 0.0187 | 210 | 1,170,000 | 11,250 | 23,350 |

TABLE VIII

| Comparative Examples | Carrier type | g | TiCl₄ g | TiCl₃ g | Ti content of supported catalyst component % by weight | Supported catalyst component employed in polymerization g | Polyethylene obtained g | g polymer g Ti |
|---|---|---|---|---|---|---|---|---|
| 1 | SiO₂ | 3.7380 | 0.1570 | — | 1.02 | 0.0753 | 0.35 | 465 |
| 2 | B₂O₃ | 7.682 | 0.2460 | — | 0.785 | 0.2870 | 0.5 | 223 |
| 3 | Al₂O₃ | 7.5484 | — | 1.6716 | 4.37 | 0.1500 | 135.50 | 26.600 |

While the examples show the use of triisobutyl aluminum as one catalyst-forming component, similar results are obtainable using other organometallic compounds, and hydrides, of the Groups I to III metals, as disclosed herein.

It will be apparent that various changes in details can be made in practicing the invention, including selection of the organometallic compound or hydride of the Group I, II or III metal; selection of the specific Ti compound; and selection of the Group III or IV compound used as diluent in the carrier, without departing from the spirit of the invention. Therefore, we intend to include, in the scope of the appended claims, all those changes and modifications which will be obvious to those skilled in the art from the description and illustrative working examples given herein.

What we claim is:

1. In the preparation of components of catalysts for the polymerization of olefins comprising (1) a Ti compound selected from the group consisting of halides, oxyhalides, haloalcoholates and alcoholates, supported on (2) an activated anhydrous Mg or Mn dihalide, the improvement of supporting said Ti compound (1) on a mixture of the anhydrous Mg or Mn dihalide (2) and (3) an anhydrous compound of silicium or boron or of a metal belonging to one of Groups III or IV of the Mendelyeev Periodic Table, in an amount of from 1 to 80 parts by weight per 100 parts of the total mixture of (2) and (3), said compound (3) being selected from the group consisting of aluminum oxide, silicium oxide, tin oxides, titanium dioxide, zirconium dioxide, aluminum sulphate, titanyl sulphate, aluminum stearate, tin basic sulphate, lead sulphate, aluminum phosphate and boric anhydride, said Ti-containing component supported on (2) and (3) having a surface area exceeding 3 m$^2$/g or an X-rays powder spectrum which does not show the most intense diffraction lines as they appear in the X-rays powder spectrum of normal Mg or Mn dihalides, and anhydrous compound (3) being one which does not interact with the active Mg or Mn dihalide to a substantial extent which would alter the activity of the activated Mg or Mn dihalide.

2. In the preparation of components of catalysts for the polymerization of olefins comprising (1) a Ti compound selected from the group consisting of the addition compounds of bivalent, trivalent and tetravalent Ti with an electron-donor compound in which the electron-donor atoms are atoms of N, P, O and S, supported on (2) an anhydrous activated Mg or Mn dihalide, the improvement of supporting said Ti compound (1) on a mixture of the anhydrous Mg or Mn dihalide (2) and (3) an anhydrous compound of silicium or boron or of a metal belonging to one of Groups III or IV of the Mendelyeev Periodic Table, in an amount of from 1 to 80 parts by weight per 100 parts of the total mixture of (2) and (3), said compound (3) being selected from the group consisting of aluminum oxide, silicium oxide, tin oxides, titanium dioxide, zirconium dioxide, aluminum sulphate, titanyl sulphate, aluminum stearate, tin basic sulphate, lead sulphate, aluminum phosphate and boric anhydride, said Ti-containing component supported on (2) and (3) having a surface area exceeding 3 M$^2$/g or an X-rays powder spectrum which does not show the most intense diffraction lines as they appear in the X-rays powder spectrum of normal Mg or Mn dihalides, and anhydrous compound (3) being one which does not interact with the activated Mg or Mn dihalide to a substantial extent which would alter the activity of the activated Mg or Mn dihalide.

3. The improvement according to claim 1, in which the anhydrous Mg or Mn dihalide is $MgCl_2$, $MgBr_2$, $MnCl_2$ or $MnBr_2$.

4. The improvement according to claim 1, in which the amount of the anhydrous compound of the Group III or Group IV metal (3) in mixture with the anhydrous Mg or Mn dihalide (2) is from 30% to 80% by weight.

* * * * *

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

Col. 2, line 62, "silicium" should be - - - silicon - - -.

Cols. 9 - 10, TABLE VIII, last column, the value for COMPARATIVE EXAMPLE 3 should be - - - 26,600 - - -, not "26.600".

Claim 1, lines 8 and 13 of the claim, "silicium" should be - - - silicon - - -.

Claim 2, line 10 of the claim, "silicium" should be - - - silicon - - -.

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

| | |
|---|---|
| Col. 2, line 61 | "Aluminum" should be - - - aluminum - - -; |
| Col. 3, line 9 | "Activated" should be - - - activated - - -; In the second formula after line 25, a comma (,) should be inserted before - - - $C_{12}H_8N$ - - -; |
| Col. 3, line 32 | "$TiH_4$" should be - - - $TiI_4$ - - -; |
| Col. 3, line 33 | the part of the formula shown as "$Ti[OC(CH_3) CH-CO-CH_3]_2Cl_2$" should appear as - - - $Ti[OC(CH_3)=CH-CO-CH_3]_2Cl_2$ - - -; |
| Col. 3, line 35 | the formula shown as "$TiCl_3(OSO_2-CH_5)$" should be - - - $TiCl_3(OSO_2-C_6H_5)$ - - -; |
| Col. 3, line 37 | the formulae shown as "$TiBr_4$" and "$O(C_2H_5)_2$" should be written as one formula: - - - $TiBr_4 \cdot O(C_2H_5)_2$ - - -; |
| line 37 | the formula written as "$2TiCl_3 \cdot C_5H_5N$-" should appear as - - - $2TiCl_3 \cdot C_5H_5N$, - - -; |

UNITED STATES PATENT AND TRADEMARK OFFICE
CERTIFICATE OF CORRECTION

PATENT NO. : 4,265,785

DATED : May 5, 1981

INVENTOR(S) : Umberto GIANNINI et al

It is certified that error appears in the above—identified patent and that said Letters Patent is hereby corrected as shown below:

Col. 3, line 38, the formula "$Li(OC_3H_7)_2Cl_3$", as printed, should be --- $Li\ Ti\ (OC_3H_7)_2\ Cl_3$ ---.

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

Col. 5, line 20    "ethyl" should be - - - ethylene - - -;

Table 1, Cols. 5 - 6,
under the heading "$MgCl_2$", the value for Example 6 should be - - - 10.0105 - - -, not "0.0105" as printed; Under the heading "Diluent" and sub-heading "Type", the diluent for Example 1 should be - - - Silica - - -, not "SMica" as printed. The diluent for Example 4 should be - - - $Al_2(SO_4)_3$ - - -, not "$Al_2(SO)_3$"; The diluent for Example 5 should be - - - $AlPO_4$ - - -, not "$AlFo_4$"; Under the heading "Polymerization", sub-heading "g Polymer g Ti" should be - - - g Polymer/g Ti - - -; The sub-heading "g Polymer g total carried component" should be - - - g Polymer/g total carried component - - -, and the value printed for Example No. 1 under the sub-heading should be - - - 10,680 - - -, not

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

<u>Table I</u> - <u>Cols. 5 - 6</u> (continued)

"10,600"; the sub-heading "g Polymer g $MgCl_2$" should be - - - g Polymer/g $MgCl_2$ - - -

<u>Table II</u>, <u>Cols. 5 - 6</u>  under the heading "Polymerization", the sub-heading "g Polymer g Ti" should be - - - g Polymer/g Ti - - -;

the sub-heading " g Polymer g total carried component" should be - - - g Polymer/g total carried component - - -;

Cols. 7 - 8  under the sub-heading "Diluent", the diluent for Example 11 should be - - - Kieselgur - - -, not "Kleselgur" as printed;

ly corrected as shown below:

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

<u>Table II</u> - <u>Cols. 7 - 8</u> (continued)

Under the heading "Polymerization", the sub-heading "g Polymer g Ti" should be - - - g Polymer/g Ti - - -; the sub-heading "g Polymer g total carried component" should be - - - g Polymer/g total carried component - - -; the sub-heading " g Polymer g $MgCl_2$" should be - - - g Polymer/g $MgCl_2$ - - -.

<u>Table III</u> - <u>Cols. 7 - 8</u>  under the heading "Polymerization" the sub-heading "g Polymer g Ti" should be - - - g Polymer/g Ti - - -; the sub-heading " g Polymer g total carried component" should be - - - g Polymer/g total carried component - - -; the sub-heading "g Polymer g $MgCl_2$" should

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

Table III - Cols. 7 - 8 (continued)

be - - - g Polymer/g $MgCl_2$ - - -;

In the footnote to Table III, the third note should be - - - n-heptane - - -.

Table IV, Cols. 7 - 8  under the heading "Polymerization", the sub-heading " g Polymer g Ti " should be - - - g Polymer/g Ti - - -;

the sub-heading "g Polymer g total carried component" should be - - - g Polymer/g total carried component - - -; the sub-heading "g Polymer g $MgCl_2$" should be - - - g Polymer/g $MgCl_2$ - - -.

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

Table V - Cols. 7 - 8     under the heading "Polymerization", the sub-heading "g Polymer g Ti" should be - - - g Polymer/g Ti - - -;

the sub-heading "g Polymer g total carried component" should be - - - g Polymer/g total carried component - - -; the sub-heading "g Polymer g $MgCl_2$" should be - - - g Polymer/g $MgCl_2$ - - -; under the general heading "Grinding of the Carried Component", the sub-heading "Titanium Compound" and the specific sub-heading "Type", the two compounds listed should be

- - - $Cl_3Ti(n-OC_3H_7)$ - - -;

and

- - - $Cl_3Ti(n-OC_3H_7)$ - - -.

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

<u>Table V</u>    In the footnotes to TABLE V, "Polymerization Conditions", the item "$H_2 = 6$ atm." should be - - - $H_2 = 5$ atm. - - -.

<u>Table VI</u> - <u>Cols. 7 - 8</u>, under the heading " Polymerization", the sub-heading " g Polymer g Ti" should be - - - g Polymer/g Ti - - -; the sub-heading "g Polymer g total earned component" should be - - - g Polymer/g total carried component - - -; the sub-heading "g Polymer g $MgCl_2$" should be - - - g Polymer/g $MgCl_2$ - - -.

<u>Cols. 9 - 10</u> the heading "Polymerization" and all sub-headings from "Example No." to "n in $dl.g^{-1}$" should be deleted.

[Note: only the footnote to Table VI should appear].

UNITED STATES PATENT AND TRADEMARK OFFICE
CERTIFICATE OF CORRECTION

PATENT NO. : 4,265,785

DATED : May 5, 1981

INVENTOR(S) : Umberto GIANNINI et al

It is certified that error appears in the above—identified patent and that said Letters Patent is hereby corrected as shown below:

<u>Table VII</u> - <u>Cols. 9 - 10</u>   the heading "g Polymer g Ti" should be - - - g polymer/g Ti - - -;

the heading "g polymer g total supported catalyst component" should be - - - g polymer/g total supported catalyst component - - -;

the heading "g pol. g $MgCl_2$" should be - - - g pol./g $MgCl_2$ - - -.

<u>Table VIII</u> - <u>Cols. 9 - 10</u> the heading "g polymer g Ti" should be - - - g polymer/g Ti - - -.

<u>Col. 9</u>   under the heading "COMPARATIVE EXAMPLES 1 to 3", the "Ti Cl" shown at the

UNITED STATES PATENT AND TRADEMARK OFFICE
CERTIFICATE OF CORRECTION

PATENT NO. : 4,265,785
DATED : May 5, 1981
INVENTOR(S) : Umberto GIANNINI et al

It is certified that error appears in the above—identified patent and that said Letters Patent is hereby corrected as shown below:

Table VIII - Cols. 9 - 10 (continued)

end of line 1 and the "$_3$ ARA" shown at the beginning of line 2 should be

- - - $TiCl_3$·ARA - - -.

Signed and Sealed this

*Twenty-ninth* Day of *June 1982*

[SEAL]

*Attest:*

GERALD J. MOSSINGHOFF

*Attesting Officer*  *Commissioner of Patents and Trademarks*